United States Patent Office 3,419,781
Patented Dec. 31, 1968

3,419,781
VOLTAGE REGULATING SYSTEMS
Jean Albert Louis Jullien-Davin, Valence, France, assignor to Crouzet, Valence, Drome, France, a French company
Filed May 25, 1966, Ser. No. 552,744
Claims priority, application France, May 29, 1965, 18,819
2 Claims. (Cl. 321—2)

ABSTRACT OF THE DISCLOSURE

A DC-DC pulse width modulated voltage regulating system includes a Schmitt trigger in the regulator circuit which controls the on-off time of the pulse width modulator.

---

Figure 2:
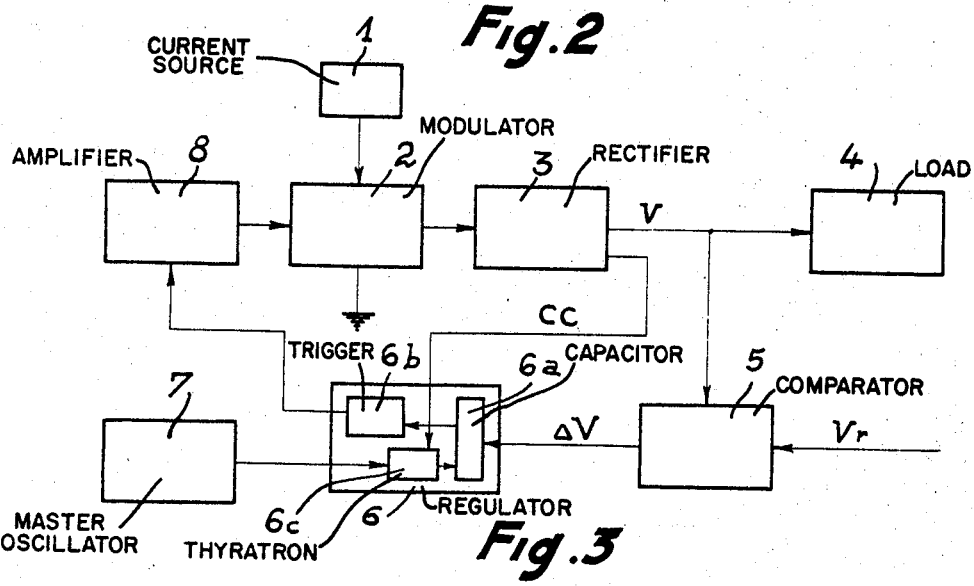

The aim of this invention is to provide a voltage-regulating system whereby a load circuit is supplied at a constant direct-current voltage referred-to as a stabilized voltage (or output voltage) from a direct-current input voltage (or supply voltage) which may be variable, said load circuit having an impedance of any value which is variable over a wide range and can even fall to zero (in the event of a short circuit, for example), in which case the above-mentioned stabilized voltage disappears so as to re-appear automatically as soon as said impedance is restored to a predetermined value.

The method which permits the achievement of the general aim outlined above consists in modulating a direct-current input voltage so as to transform said voltage in a known manner into an alternating-current voltage having waves of rectangular form or so-called square waves and having a fixed frequency, in rectifying and smoothing said alternating-current voltage so as to retransform it into a direct-current output voltage for utilization in a load circuit, in comparing said direct-current output voltage with a reference voltage and in utilizing the difference voltage which results from comparison for the purpose of modifying the width of the square waves, stabilizing the output voltage and maintaining said voltage constant independently of the variations both in input voltage and in impedance of the load circuit.

The reference voltage is advantageously a fraction of the input voltage which is stabilized at the avalanche voltage of a ZENER diode.

The device which serves to carry the above method into practice comprises modulating means controlled by a local master oscillator which is stabilized on a fixed recurrence period and transmits pulses of constant duration so as to transform a direct-current input voltage or primary voltage into an alternating-current voltage having square waves of variable amplitude which is a function of the input voltage, said square-wave alternating-current voltage being re-transformed by rectifying and smoothing means into a direct-current output voltage or working voltage which is compared in comparator means with a fixed reference voltage, the difference voltage which results from this comparison being transmitted by said comparator means to regulating means which are on the one hand interposed between the output of the master oscillator and the aforesaid modulating means and, on the other hand, so arranged as to control the width of the square waves as a function of the aforesaid difference voltage in such a manner as to obtain a constant output voltage which is independent both of the input voltage and of the load.

The refernce voltage is advantageously supplied by a Zener diode.

According to the invention, the regulating means which are controlled by the refernce voltage comprise a Schmitt trigger, the output of which is connected to the modulating means and the input of which is connected to a unit consisting of a capacitor connected in series with a resistor, the time constant of said unit being longer than the recurrence period and said unit being intended to receive the difference voltage which is derived from the comparator means, said capacitor being coupled with a thyratron which, under the action of the master oscillator with which said thyratron is coupled, discharges said capacitor at predetermined intervals.

Figure 3:
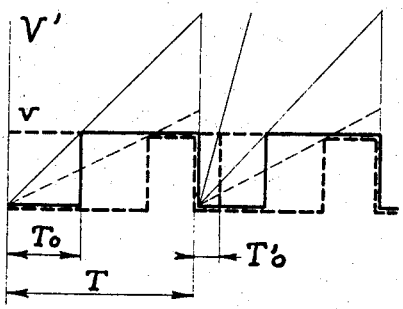
Figure 5:
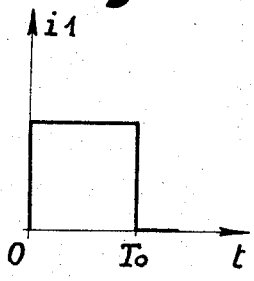
Figure 6:
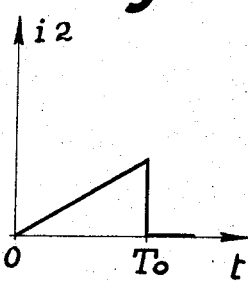
Figure 7:
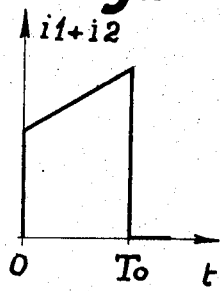
Figure 1:
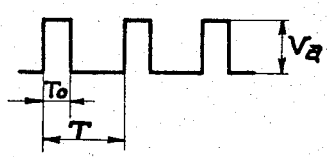
Figure 4:
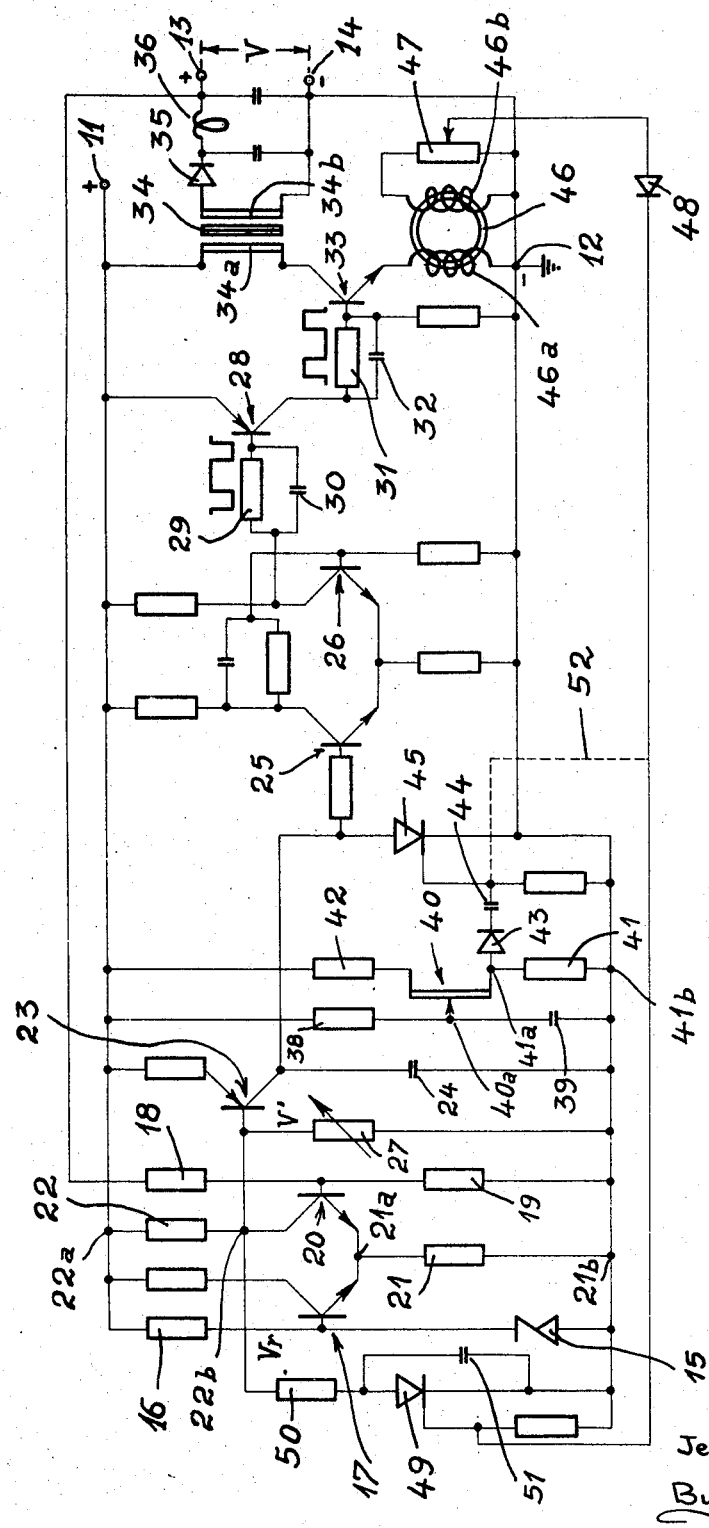

Other particular features and characteristics of the invention will be brought out by the description which now follows below. Reference is made to the accompanying drawings, in which:

FIG. 1 represents a train of rectangular pulses or square waves;
FIG. 2 is a block diagram of the complete device;
FIG. 3 is a diagram showing the means employed for obtaining the so-called "width-modulation" of the square waves;
FIG. 4 is a diagram of one specific embodiment of the device; and finally,
FIGS. 5, 6 and 7 are diagrams of certain processes which take place in the device of FIG. 4.

In FIG. 1, the reference T designates the recurrence period of each full pulse of the square-topped pulse train which is shown in said figure, the reference $To$ designates the width of each square-topped pulse or square wave and $Va$ represents the peak amplitude.

When these pulses are applied to a purely ohmic circuit having a resistance R, the power $Pwi$ which is dissipated in said resistance is proportional to $To$.

Should these pulses be rectified and filtered, the dissipated direct-current power $Pw$ has the value:

$$P_w \rho \frac{1}{T} \int_0^{To} \frac{Va^2}{R} dt = \frac{v^2}{R}$$

wherein $\rho$ designates the detection efficiency and V represents the direct-current voltage.

In order to maintain constant the voltage V across the terminals of the resistor R, it is merely necessary to modify the width $To$ or in other words to modulate the square-topped pulses "in width."

In FIG. 2, the reference numeral 1 serves to designate a direct-current voltage source or primary source which is coupled with modulating means 2 for transforming said direct-current voltage into a square-wave alternating-current voltage by virtue of rectifying and smoothing means 3, said alternating-current voltage is re-transformed into a direct current voltage V which is intended to be applied to the load 4 (operational output).

The direct-current output voltage V is compared in comparator means 5 with a direct-current reference voltage $Vr$ of constant value. At the output of said comparator means, any suitably amplified voltage differences $\Delta V$ (referred-to as difference voltages) which may be found to exist are employed for the purpose of operating the regulating means 6 which, on the one hand, are controlled by a master oscillator 7 which determines the fixed recurrence frequency T of the square waves produced by the modulating means 2 and, on the other hand, determine within said modulating means and through the intermediary of an amplifier 8 the width $To$ of the square waves as a function of $\Delta V$.

As is apparent from the foregoing, provision is thus made for a looped system in which the difference between the output voltage V and the reference voltage $Vr$ is inversely proportional to the gain of the open-loop chain. The drift is that of the reference voltage $Vr$ and the comparator means 5.

In order to protect the load circuit 4 and the regulating device itself against any abrupt and substantial increase in the current delivered (short circuit, heavy overload), provision is made for a safety system which will be described in greater detail hereinafter, whereby a control voltage is obtained and applied via the load control line CC to the regulating means 6 in which said control voltage performs the same function as the pulses of the oscillator 7 but by shortening the time To.

The regulating means 6 which transform $\Delta V$ into $\Delta To$ comprise an element 6a which is essentially formed of a capacitor C which is connected in series with a resistor having the value R.

The voltage V' developed across the terminals of the aforesaid capacitor increases linearly as a function of time so as to attain maximum value when said capacitor is charged. The values of C and R are chosen so that the time constant RC of the element 6a is in all cases longer than the recurrence period T, with the result that the voltage V' rises linearly (throughout the period T) at an angle of slope which is steeper as $\Delta V$ is greater.

The voltage V' is applied via a Schmitt trigger 6b to the amplifier 8.

The trigger 6b is adapted to transmit the voltage V' to said amplifier as long as $V' < v$ ($v$ being a constant value referred-to as a "trigger threshold") and to stop transmitting said voltage V' when $V' \geq v$, at which moment the trigger circuit trips.

At the end of each recurrence period T, the oscillator 7 operates a thyratron 6c which forms part of the regulating means 6, with the result that said thyratron causes the capacitor of the element 6a to discharge ($V=0$) and causes the trigger circuit 6b to trip in the opposite direction and thus to revert to its initial state. And the cycle then restarts.

Inasmuch as the amplifier 8 is operated during the entire period To in which $$0 < V' < v$$

this time To is correspondingly shorter as the slope of the voltage V' is steeper, that is to say as $\Delta V$ is greater, as can be readily seen from FIG. 3.

In the event of overload occurring, the pulsating voltage which appears on the load control line CC takes the place of the oscillator 7 and operates the thyratron 6c, with the result that the capacitor of the element 6a discharges before the voltage V' has attained the value $v$, the time To being accordingly shortened.

In point of fact, and as will become apparent hereinafter, it is an advantage to deliver the overload pulse CC through an auxiliary thyratron to the comparator means 5 which also comprise amplifying means, the result thereby achieved being that the aforesaid overload pulse has the benefit of a certain degree of amplification upstream of the thyratron 6c.

FIG. 4 shows in a detailed manner and by way of non-limitative example one specific and advantageous mode of application of the invention. In this figure, the functions of the comparator means, oscillators, modulators, rectifier-filter units and the functions of the trigger circuit are not sharply differentiated as in FIG. 2 in order that a clear understanding may be gained of the general means which form the basis of the invention.

The resistors shown in FIG. 4 are all represented by a rectangle. It will also be noted that reference numerals have been specifically assigned only to those resistors and other electronic elements of the system as a whole which usefully serve to explain the invention, by reason of the fact that all other elements which do not bear numerals are provided for the purpose of regulating impedances, limiting current intensities, defining constants and the like and therefore do not in theory have any direct bearing on the principle of operation of the apparatus, as will readily be understood by those versed in the art.

The supply voltage produced by the non-stabilized primary current source 1 (reference 1 in FIG. 2), that is to say the voltage which is subject to variations, is applied to the positive terminal 11 and negative terminal 12 which in this example is connected to ground (earth).

The constant working voltage V or stabilized output voltage is taken from the positive output terminal 13 and negative output terminal 14.

By virtue of a Zener diode 15, the input voltage which is applied to the terminals 11 and 12 provides by means of a resistor 16 the reference voltage Vr which is applied to the base of the transistor 17.

Similarly, the output voltage V provides by means of resistors 18 and 19 a voltage $v'$ (which is proportional to the voltage V) at the base of the transistor 20. The result thereby achieved is that the two transistors 17 and 20 deliver current into a resistor 21 which gives rise to a potential difference across the terminals 21a and 21b of the resistor 21. This potential difference accordingly results in the appearance of a voltage at the terminal 21a (the terminal 21b being grounded, that is to say at zero potential).

The transistor 20 delivers current into a resistor 22, thereby giving rise to a voltage drop between the terminals 22a and 22b of said resistor. Said voltage drop therefore results in the appearance beneath the terminal 22b of a voltage which is applied to the base of a transistor 23 constituting a constant-current amplifier (during the period T but variable according to $\Delta V$). The transistor 23 charges up the capacitor 24, and the voltage V' of said capacitor (which increases linearly as can be seen from FIG. 3 and which is zero at the start of a recurrence period T) is applied to the base of a transistor 25 which, together with a transistor 26 and associated elements, constitute the Schmitt trigger circuit 6b.

A variable resistor 27 serves to regulate the constant current of the transistor 23 in such a manner that the capacitor 24 is not fully charged at the end of the recurrence period T (otherwise the voltage V' would no longer increase linearly and would assume a constant maximum value).

The voltage V' which controls the trigger circuit 6b increases linearly from zero. Throughout the time interval To during which $$0 < V' < v$$

($v$ being a fixed or so-called "threshold" voltage of the trigger circuit which, as is known, acts as an amplifier at the output of which a voltage is collected as long as its functional control voltage $v'$ is lower than $v$), the trigger circuit 6b transmits a pulse to the base of a transistor 28 which constitutes a preamplifier. In order that said pulse (the width of which is defined by the time To) should have as steep a front as possible, the coupling between the trigger circuit 6b and the amplifier 28 is provided by means of a unit comprising a resistor 29 which is connected in parallel with a capacitor 30.

The above-mentioned amplifier 28 controls in its turn, via a resistor 31 and a parallel-connected capacitor 32 (which are intended to provide as steep a pulse front as possible), a power amplifier 33 which consists of a transistor and which is designed to deliver the pulses into the primary winding 34a of a transformer 34 which constitutes the modulator. Pulses are collected at the secondary 34b of said transformer 34 and these different pulses follow each other at the recurrence frequency $1/T$, with the result that there appears at the terminals of the secondary winding 34b an alternating-current voltage which is rectified by a diode 35 then smoothed in a filter 36 at the output of which the working voltage V is collected.

The recurrence period is defined by the oscillator 7 (shown in FIG. 2) which, in FIG. 4, is formed by the resistor 38, the capacitor 39 and the single-junction transistor 40 which is associated with the resistors 41 and 42.

Starting from zero time, the capacitor 39 charges up through the resistor 38, with the result that the voltage which appears at the terminal 40a of the single-junction transistor 40 rises progressively; when said voltage reaches a given level, the transistor 40 abruptly delivers into the resistor 41 at the same time as the capacitor 39 discharges, thus giving rise to the appearance between the terminals 41a and 41b of a substantial potential difference.

The voltage which appears in the form of a pulse at the terminal 41a operates via the diode 43 and capacitor 44 the thyratron 45 which then abruptly grounds the base of the transistor 25 and discharges the capacitor 24, thus causing the trigger circuit 6b to fall back to zero, the cycle being thus in readiness to restart.

The process which takes place at the time of a variation in the output voltage V will now be described.

If the voltage V increases, the voltage V' at the base of the transistor 20 rises, with the result that the output of said transistor increases, thus producing an increase in the potential difference across the terminals 22a and 22b of the resistor 22. As a consequence, the transistor 23 delivers a current of higher intensity and the capacitor 24 charges up more rapidly; the time interval To is accordingly shortened (see the full line in FIG. 3) with a resulting tendency to reduce the output voltage V which is thus maintained constant. An increase in the supply voltage tends to produce an increase in the working voltage V and the regulation process is then the same as that which has just been described.

If the external load has an insufficient resistance (or even zero in the case of a short circuit) or if said load is constituted by a substantial capacitance (which, at the moment of application of voltage, behaves in the same manner as a short circiut), the current intensity which is drawn from the secondary winding 34b of the transformer 34 is of a very high order. When brought to the primary winding 34a, this current intensity will exceed the design output of the power transistor 33 which is thus liable to incur damage since the normal regulation process tends to cause the comparator to operate in such a manner as to increase the time interval To to its maximum value.

In order to circumvent this disadvantage, the load of the output or load circuit which is connected to the terminals 13 and 14 is continuously controlled. This control operation is carried out by virtue of the fact that the current which passes through the primary winding 34a of the transformer 34 also passes through the primary winding 46a of a toroidal-core transformer 46, a voltage being induced at each pulse output within the secondary winding 46b of said transformer 46. A fraction of this voltage which is defined by the potentiometer 47 is delivered in the form of pulses via a diode 48 to a thyratron 49.

If the load is normal, the pulse which is delivered to the thyratron 49 is not sufficient to operate this latter. If, on the contrary, the load is too high, a rapid increase in current intensity within the primary winding 46a of the transformer 46 will generate a pulse which will prove sufficient to ignite the thyratron 49 which lowers the voltage of the terminal 22b to a considerable extent by grounding this latter through the resistor 50. At this moment, the transistor amplifier produces maximum action and the voltage V' of the capacitor 24 will rise very rapidly.

The width of To which is normal prior to an overload condition will be reduced at the time of overload to a value T'o in the vicinity of zero (as shown in the right-hand portion of FIG. 3). As soon as the time interval T'o has passed, the trigger circuit 6b trips and the system will produce no further pulses during the current period of recurrence. It will be noted that the potentiometer 47 serves to adjust the load threshold beyond which the above-described safety system is intended to come into action.

By reason of the fact that the pulse which is applied to the thyratron is very short, provision is made in order to prevent any abrupt voltage rise at the terminal 22b for a capacitor 51 which charges slowly via the resistors 22 and 50 and which imposes a certain delay on the restoration of the voltage at the terminal 22b.

The safety system which has just been described is advantageous in the case in which the load circuit which is connected to the output terminals 13 and 14 comprises a substantial capacitance which has to be charged. In fact, inasmuch as T'o is not strictly zero, the above-mentioned capacitor receives a small charge at the time of each period T until a sufficient charge is acquired and no longer constitutes an overload on the regulating system in accordance with the invention.

One simplified solution of the safety system consists in dispensing with the thyratron 49 and associated elements and in delivering the overload pulse directly from the diode 48 to the thyratron 45 via the lead 52 which is shown in broken lines. However, in this case, the trigger circuit 6b does not trip and will accordingly transmit a series of small pulses during the same period T, with the result that the safety obtained will be less effective.

In the example of FIG. 4, the transistors 17, 20, 25, 26 and 33 are of the n-p-n type whilst the transistors 23 and 28 are of the p-n-p type. However, it will be apparent that the diagram of FIG. 4 could also be modified in such a manner that the transistors 17, 20, 25, 26 and 33 are of the p-n-p type whereas the transistors 23 and 28 would be of the n-p-n type.

The direction of the secondary winding 34b and the connection of the diode 35 are such that the diode referred-to is conductive when the transistor 33 is saturated. Under these conditions, the load which is brought to the primary winding 34a comprises the primary inductance in parallel with the load which is returned through the secondary winding.

During the period of conduction of the transistor 33, the current within the primary winding 34a has the value $X = i_1 + i_2$, wherein $i_1$ corresponds to the load which is returned through the secondary winding (FIG. 5)

$$i_1 = \frac{Vcc}{n^2 RL}$$

in which $n$ is the transformation ratio, $Vcc$ is the direct-current voltage at the collector of the transistor 33, and $i_2$ is the magnetizing current.

Now, in view of the fact that $$Vcc = L \frac{di_2}{dt}$$

is constant, the current increases linearly with time (FIG. 6) and $$i_2 = at$$

The total current intensity I at the primary winding (see FIG. 7) is $I = i_1 + i_2$.

The mean value ($Im$) of I is:

$$Im = \frac{1}{T} \int_0^T I\, dt$$
$$= \frac{1}{T} \int_0^T \left(\frac{Vcc}{n^2 R} + at\right) dt$$
$$= \frac{Te}{T}\left(\frac{Vcc}{n^2 R} + \frac{aTo^2}{2T}\right)$$

During the period of non-conduction of the transistor 33, the magnetic energy ($\frac{1}{2}Li^2$ max.) which is stored during the conduction period by the primary inductance is restored in the form of voltage on the one hand within the primary winding 34a in which it is added to the voltage of the primary source connected to the terminals 11 and 12 and, on the other hand, within the secondary winding 34b as long as the diode 35 is conductive.

During the non-conduction period, the primary voltage becomes $$Vcc = Va + Vi$$

with $$Vi = \frac{d\phi}{dt} 10^{-8}$$

The power which is restored to the secondary 34b of the transformer 34 as long as the diode 35 is conductive contributes to the efficiency. This efficiency is a function of the losses within the power transistor 33 and within the magnetic circuit. In view of the fact that said losses increase with the frequency, it proves necessary to adopt as low a value of frequency as possible which nevertheless remains compatible with the smoothing effected by the filter 36. In practice, the choice of the frequency is not critical since there exists a fairly wide frequency range which is compatible with good efficiency and ease of smoothing.

It will be noted that it is possible to obtain by means of the system a number of direct-current voltages $V_1$, $V_2$, and so forth which are proportional to V and which are constant. To this end, it is merely necessary to provide on the transformer 34 a similar number of secondary windings (not shown in the drawings) which each supply a corresponding filter via a diode. The negative terminal of the different secondary windings can be connected to a common ground (earth) as contemplated in the case of the terminal 12, or else they can be independent of said ground, and the overload control which is effected through the toroidal-core transformer 46 on the load which is brought to the primary winding 34a of the above-mentioned transfer 34 will take place irrespective of the secondary winding or windings of said transformer which may be overloaded.

Experience has shown that the efficiency of the device is excellent on condition that the square-topped waves are in fact of rectangular form. The power transmitted is proportional to the surface area of the square waves and the maximum surface area corresponds to a rectangle in the case of a given peak voltage $Va$ and width $To$. The only losses which are not negligible occur within the power amplifier 33 and within the transformer 34.

It is apparent that the specific example of construction of the regulating device hereinabove described in reference to the accompanying drawings has been given solely by way of indication without implied limitation and that any or all detail modifications can be contemplated.

What I claim is:

1. A regulating device for supplying a load having any indeterminate and variable impedance at a constant direct-current voltage from an input voltage which is also variable, said device comprising a local master oscillator which is stabilized on a fixed recurrence period and designed to deliver pulses of constant duration, modulating means connected to and controlled by said master oscillator so as to transform a direct-current primary input voltage into an alternating-current voltage of rectangular waveform of the class of square waves having an amplitude which is a function of the input voltage and which can be variable, rectifying and smoothing means connected to the modulating means for transforming said alternating-current voltage into a direct-current output voltage, generating means for producing a fixed reference voltage, comparator means connected to said generating means and to said rectifying means for comparing the output voltage with the fixed reference voltage and for thus generating a difference voltage which results from this comparison, regulating means which are, on the one hand, interposed between the output of the master oscillator and said modulating means and, on the other hand, connected to said comparator means so as to control the width of the square waves as a function of said difference voltage in such a manner as to ensure that the output voltage is constant and independent both of the input voltage and of the load, wherein said regulating means comprise a Schmitt trigger whose output is connected to the modulating means and additionally comprises a unit which is coupled with the input of said trigger and which consists of a capacitor in series with a resistor, said unit having a time constant which is higher than the recurrence period and which receives the difference voltage derived from the comparator means, said capacitor being coupled with a thyratron which, under the action of the master oscillator with which said thyratron is coupled, causes said capacitor to discharge at predetermined intervals.

2. A regulating device as defined in claim 1, further comprising safety means which operate in opposition to the comparator means, in order to reduce the width of the square waves to a substantial extent and to bring said width to a virtually zero value in the event of a substantial reduction in the impedance of the load circuit, said safety means comprising a toroidal-core transformer through the primary winding of which is passed a current which is a function of the output voltage, and an auxiliary thyratron which is connected, via a diode, to the secondary winding of said transformer and the ignition of which produces a rapid increase in the voltage of the capacitor of the regulating means.

References Cited

UNITED STATES PATENTS

| | | | |
|---|---|---|---|
| 3,305,756 | 2/1967 | Doss et al. | 321—18 X |
| 3,315,146 | 4/1967 | Paice | 321—18 X |
| 3,341,765 | 9/1967 | Rogers et al. | 321—2 |
| 3,355,653 | 11/1967 | Paradissis | 321—45 X |

JOHN F. COUCH, *Primary Examiner.*

W. H. BEHA, Jr., *Assistant Examiner.*

U.S. Cl. X.R.

321—14, 18